United States Patent
Lv et al.

(10) Patent No.: US 12,114,121 B2
(45) Date of Patent: Oct. 8, 2024

(54) METHOD FOR CHARGING WIRELESS HEADSET, CHARGING CIRCUIT AND CHARGING CASE

(71) Applicant: BEIJING XIAOMI MOBILE SOFTWARE CO., LTD., Beijing (CN)

(72) Inventors: Xuede Lv, Beijing (CN); Jie Fan, Beijing (CN)

(73) Assignee: BEIJING XIAOMI MOBILE SOFTWARE CO., TLD., Beijing (CN)

( * ) Notice: Subject to any disclaimer, the term of this patent is extended or adjusted under 35 U.S.C. 154(b) by 247 days.

(21) Appl. No.: 17/955,360

(22) Filed: Sep. 28, 2022

(65) Prior Publication Data
US 2023/0412960 A1 Dec. 21, 2023

(30) Foreign Application Priority Data
Jun. 20, 2022 (CN) .......................... 202210701905.6

(51) Int. Cl.
*H04R 1/10* (2006.01)
*H02J 7/00* (2006.01)

(52) U.S. Cl.
CPC .......... *H04R 1/1025* (2013.01); *H02J 7/0068* (2013.01); *H02J 7/007182* (2020.01); *H04R 1/1041* (2013.01); *H04R 2460/17* (2013.01)

(58) Field of Classification Search
CPC ............... H04R 1/1025; H04R 1/1041; H04R 2460/17; H02J 7/0029; H02J 7/0044; H02J 7/0068; H02J 7/007182; H02J 7/06
See application file for complete search history.

(56) References Cited

U.S. PATENT DOCUMENTS

| | | |
|---|---|---|
| 2001/0015634 A1 | 8/2001 | Shirakawa |
| 2007/0257635 A1 | 11/2007 | Yang |
| 2015/0145468 A1* | 5/2015 | Ma .......................... H02J 7/007 320/107 |
| 2016/0141906 A1 | 5/2016 | Jung |
| 2021/0159709 A1* | 5/2021 | Kim .................. H02J 7/007182 |
| 2022/0385094 A1* | 12/2022 | Liang ................ H02J 7/007192 |

OTHER PUBLICATIONS

Extended European Search Report of EP Application No. 22198503.9 filed Jun. 2, 2023, (12p).

* cited by examiner

*Primary Examiner* — Huyen D Le
(74) *Attorney, Agent, or Firm* — Arch & Lake LLP; Hao Tan; Zhangyuan Ji

(57) ABSTRACT

A charging circuit is provided. The charging circuit includes a protection circuit and a charging control switch connected in series, and a transfer switch. The transfer switch is configured to switch to a first charging circuit by connecting to the protection circuit, and switch to a second charging circuit by connecting to the charging control switch. A maximum charging voltage of the first charging circuit is lower than a maximum charging voltage of the second charging circuit.

20 Claims, 2 Drawing Sheets in response to determining that the wireless headset is placed in the charging case, switching to a first charging circuit by controlling the transfer switch to be connected to the protection circuit, and charging the wireless headset by the first charging circuit — 301 in response to determining that a voltage difference between an output voltage of a power supply and a charging voltage of the wireless headset is greater than a second difference threshold, switching to a second charging circuit by controlling the transfer switch to be connected to the charging control switch, and charging the wireless headset by the second charging circuit — 302

METHOD FOR CHARGING WIRELESS HEADSET, CHARGING CIRCUIT AND CHARGING CASE

CROSS REFERENCE TO RELATED APPLICATION

This application is filed based upon and claims priority to Chinese Patent Application No. 202210701905.6, filed on Jun. 20, 2022, the entire content of which is incorporated herein by reference for all purposes.

TECHNICAL FIELD

The disclosure relates to the field of charging technologies, in particular to a method for charging a wireless headset, a charging circuit, and a charging case.

BACKGROUND

The direct charging technology is adopted by an existing charging case, which is provided with a charging circuit. The charging circuit passes through a communication circuit, a protection circuit and a charging control switch in the charging case. At different charging phases for a battery included in a wireless headset, the charging circuit in the charging case is adopted to charge the battery.

SUMMARY

According to a first aspect of the disclosure, a charging circuit is provided. The charging circuit includes a protection circuit and a charging control switch connected in series, and a transfer switch. The transfer switch is configured to switch to a first charging circuit by connecting to the protection circuit, and switch to a second charging circuit by connecting to the charging control switch. A maximum charging voltage of the first charging circuit is lower than a maximum charging voltage of the second charging circuit.

According to a second aspect of the disclosure, a charging case is provided, including: a charging interface, configured to connect the charging case to a power supply; a charging base, configured to place a wireless headset; and a charging circuit. The charging circuit includes a protection circuit and a charging control switch connected in series, and a transfer switch. The transfer switch is configured to switch to a first charging circuit by connecting to the protection circuit, and switch to a second charging circuit by connecting to the charging control switch. A maximum charging voltage of the first charging circuit is lower than a maximum charging voltage of the second charging circuit.

According to a third aspect of the disclosure, a method for charging a wireless headset with a charging case is provided. The charging case may include a protection circuit and a charging control switch connected in series, and a transfer switch. The method includes: in response to determining that the wireless headset is placed in the charging case, switching to a first charging circuit by controlling the transfer switch to be connected to the protection circuit, and charging the wireless headset by the first charging circuit and in response to detecting that a voltage difference between an output voltage of a power supply and a charging voltage of the wireless headset is greater than a second difference threshold, switching to a second charging circuit by controlling the transfer switch to be connected to the charging control switch, and charging the wireless headset by the second charging circuit. A maximum charging voltage of the first charging circuit is lower than a maximum charging voltage of the second charging circuit.

It should be understood that, the above general description and the following detailed description are only exemplary and explanatory, and do not limit the present disclosure.

BRIEF DESCRIPTION OF THE DRAWINGS

The drawings herein are incorporated into the specification and form a part of the specification, showing embodiments consistent with the disclosure. The drawings are used together with the specification to explain the principles of the disclosure, and do not constitute an improper limitation of the disclosure.

DETAILED DESCRIPTION

In order to enable those skilled in the art to better understand the technical solution of the present disclosure, the technical solution in the embodiments of the present disclosure will be clearly and completely described below in combination with the accompanying drawings.

It should be noted that the terms "first," "second" and the like in the specification, the appended claims and the above drawings of the present disclosure are used to distinguish similar objects, and need not be used to describe a specific order or sequence. It should be understood that the data thus used may be interchanged as appropriate so that the embodiments of the present disclosure described herein may be implemented in an order other than those illustrated or described herein. The embodiments described in the following exemplary embodiments do not represent all embodiments consistent with the present disclosure. Rather, they are merely examples of apparatuses and methods consistent with some aspects of the present disclosure as indicated by the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

In the existing charging case, a total impedance of the charging circuit is relatively high and the charging efficiency is poor. In view of this, the disclosure provides a method for charging a wireless headset, a charging circuit, and a charging case.

According to the disclosure, the charging circuit includes the first charging circuit and the second charging circuit, in which the maximum charging voltage of the first charging circuit is lower than a maximum charging voltage of the second charging circuit, the first charging circuit includes a communication circuit for determining whether to switch the first charging circuit to the second charging circuit, thus charging the battery by the two charging circuits, leading to a low impedance and improving the charging efficiency.

Figure 1:
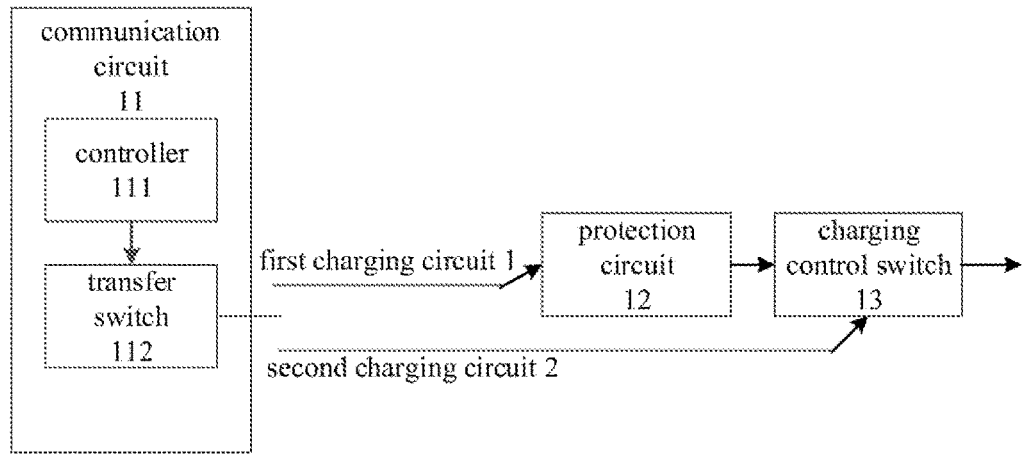
FIG. 1 is a structural schematic diagram of a charging circuit according to an embodiment of the disclosure.

FIG. 1 is a structural schematic diagram of a charging circuit according to an embodiment of the disclosure. It should be noted that, the charging circuit may be used to charge hardware devices such as wireless headsets, wireless watches and mobile phones. The purpose of the charging circuit is not limited here.

As shown in FIG. 1, the charging circuit includes a first charging circuit 1 and a second charging circuit 2. A maximum charging voltage of the first charging circuit 1 is lower than a maximum charging voltage of the second charging circuit 2.

The first charging circuit 1 includes a communication circuit 11. The communication circuit 11 is configured to determine whether to switch the first charging circuit 1 to the second charging circuit 2.

As shown in FIG. 1, the first charging circuit 1 also includes a protection circuit 12 and a charging control switch 13. The charging control switch 13 is connected to the protection circuit 12. The communication circuit 11 includes a controller 111 and a transfer switch 112. The transfer switch 112 is connected to the controller 111 and a power supply. The transfer switch is configured to connect the power supply to the protection circuit 12 or the charging control switch 13.

The controller 111 is configured to control the transfer switch 112 to be connected to the protection circuit 12, for forming the first charging circuit, or is configured to control the transfer switch 112 to be connected to the charging control switch 13, for forming the second charging circuit.

The first charging circuit passes through the communication circuit 11, the protection circuit 12 and the charging control switch 13. The second charging circuit passes through the communication circuit 11 and the charging control switch 13. Since the first charging circuit passes through the protection circuit 12 with a high impedance, the impedance of the first charging circuit is higher than that of the second charging circuit.

In the embodiment of the present disclosure, in an example, the transfer switch 112 may be a single-pole double-throw switch, which includes one fixed end and two movable ends. The fixed end is connected to the power supply, the first movable end is connected to the protection circuit 12, and the second movable end is connected to the charging control switch 13. The first charging circuit is formed when the transfer switch 112 is switched to the protection circuit 12, i.e., when the fixed end is connected to the first movable end. The second charging circuit is formed when the transfer switch 112 is switched to the charging control switch 13, i.e., the fixed end is connected to the second movable end.

In another example, the transfer switch 112 may be two single-pole single-throw switches, in which the first switch is connected to the power supply and the protection circuit 12, and the second switch is connected to the charging control switch 13. The first switch of the two switches is connected and the second switch is disconnected. Alternatively, the first switch is disconnected and the second switch is connected.

In the embodiment of the disclosure, a starting condition of the first charging circuit 1 is that a voltage difference between an output voltage of the power supply and a charging voltage of a charging load is greater than a first difference threshold. A condition for switching the first charging circuit 1 to the second charging circuit 2 is that a voltage difference between the output voltage of the power supply and the charging voltage of the charging load is greater than a second difference threshold. The second difference threshold is lower than the first difference threshold. The first difference threshold may be for example, 0.2V.

The charging voltage of the charging load may be set differently according to different charging phases. For example, in a pre-charge phase, the maximum charging voltage of the charging load is a first voltage. In a non pre-charge phase, the maximum charging voltage of the charging load is a second voltage. The first voltage is less than the second voltage.

That is to say, for the same voltage of the power supply, the maximum charging voltage of the charging load is small at the pre-charge phase, so that the voltage difference between the output voltage of the power supply and the charging voltage of the charging load is greater than the first difference threshold, the transfer switch is controlled by the controller to be connected to the protection circuit, and the first charging circuit is thus formed. At the same time, the controller communicates with a charging management chip, and the charge management chip controls the protection circuit to communicate with the charging control switch, so that the charging load is charged by the first charging circuit. In the non pre-charge phase, the maximum charging voltage of the charging load is large, so that the voltage difference between the output voltage of the power supply and the charging voltage of the charging load is less than the first difference threshold and greater than the second difference threshold, the transfer switch is controlled by the controller to be connected to the charging control switch. At the same time, the controller communicates with the charging management chip, and the charging management chip controls the charging control switch to be connected, so that the charging load is charged by the second charging circuit.

Figure 2:
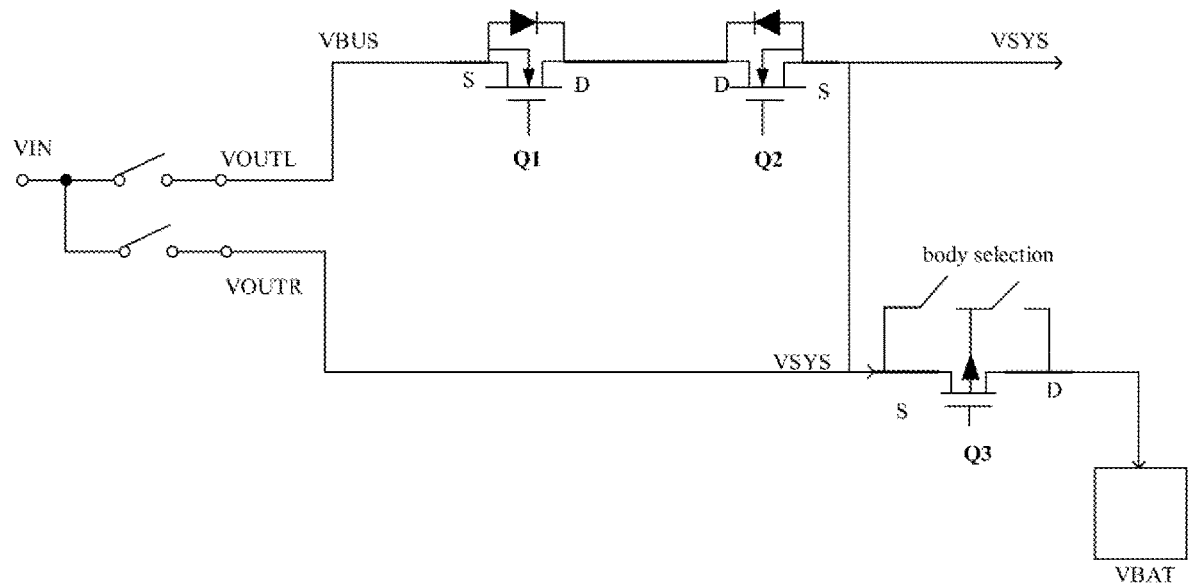
FIG. 2 is a circuit schematic diagram of a charging circuit according to another embodiment of the disclosure.

In some embodiments, as shown in FIG. 2, FIG. 2 is a circuit schematic diagram of a charging circuit according to another embodiment of the disclosure. In FIG. 2, the protection circuit 12 includes a first metal oxide semiconductor (MOS) switch circuit Q1 and a second MOS switch circuit Q2 connected in an order. The first MOS switch circuit and the second MOS switch circuit are N-channel MOS switch circuits. The D pole of the first MOS switch circuit is connected to the D pole of the second MOS switch circuit.

The charge management chip is configured to control the connection or disconnection of the first MOS switch circuit and the second MOS switch circuit.

In some embodiments, as shown in FIG. 2, the charging control switch 13 includes a third MOS switch circuit Q3. The third MOS switch circuit is a P-channel MOS switch circuit. The main body of the P-channel MOS switch circuit and the S pole are connected through a sub switch. The main body of the P-channel MOS switch circuit is connected to the D pole through a sub switch.

The charge management chip controls the connection or disconnection of the third MOS switch circuit through the sub switch.

In FIG. 2, VIN represents an input end of the power supply, VBAT represents a battery voltage in the wireless headset, VBUS represents an input voltage of the protection circuit, VSYS represents an input voltage of the charging control switch, VOUTL represents a voltage at a movable end of the transfer switch connected to the protection circuit, and VOUTR represents a voltage at a movable end of the transfer switch connected to the charging control switch.

The impedance of the protection circuit may be, for example, 300 mΩ. The impedance of the charging control switch may be, for example, 80 mΩ. When the second charging circuit is used for charging, the impedance of the second charging circuit is lower than that of the first charging circuit, heat generation of the charging circuit is thus reduced and the charging efficiency is improved.

The charging circuit according to an embodiment of the disclosure includes a first charging circuit and a second charging circuit, the maximum charging voltage of the first charging circuit is lower than the maximum charging voltage of the second charging circuit. The first charging circuit includes a communication circuit for determining whether to switch the first charging circuit to the second charging circuit, so that the battery may be charged by two charging circuits, in which the second charging circuit has a larger maximum charging voltage and a smaller impedance than the first charging circuit, thus improving the charging efficiency.

According to a second aspect of embodiments of the disclosure, a charging case is provided, including the charging circuit according to the above-described embodiment. In response to determining that a wireless headset is placed in the charging case, the wireless headset is charged by one of the first charging circuit and the second charging circuit included in a charging circuit of the charging case.

According to a third aspect of embodiments of the disclosure, a charging system is provided. The system includes: a charging case and a wireless headset.

The charging case includes the charging circuit according to the above-described embodiment.

In response to determining that a wireless headset is placed in the charging case, the wireless headset is charged by one of the first charging circuit and the second charging circuit included in a charging circuit of the charging case.

Figure 3:
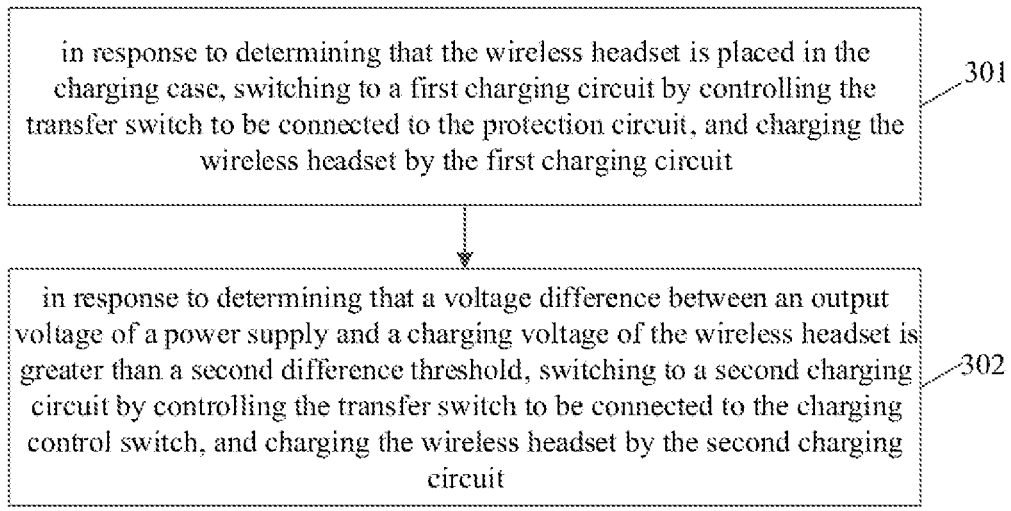
FIG. 3 is a schematic flowchart of a method for charging a wireless headset according to an embodiment of the disclosure.

FIG. 3 is a schematic flowchart of a method for charging a wireless headset according to an embodiment of the disclosure. It should be noted that, the method for charging a wireless headset according to this embodiment is performed by an apparatus for charging a wireless headset, which may be implemented by software and/or hardware, and the apparatus may be configured in an electronic device. The electronic device may include a charging case, a charging circuit in the charging case, or a controller in the charging circuit. The wireless headsets may be such as Bluetooth earphones, etc. In the following embodiments, taking as an example that the apparatus for charging a wireless headset is the controller in the charging circuit.

As shown in FIG. 3, the method includes the following steps at S301-S302.

At S301, in response to determining that the wireless headset is placed in the charging case, the transfer switch is controlled to be connected to the protection circuit, for switching to a first charging circuit and charging the wireless headset by the first charging circuit.

The charging case is one matched to a wireless headset. When the wireless headset is placed in the charging case, the charging case may charge the wireless headset. The charging phases of the wireless headset may include a pre-charge phase and a non pre-charge phase. The non pre-charge stage is, for example, a constant current charging stage or a constant voltage charging stage. The pre-charge phase is, for example, a trickle charge phase.

In the pre-charge phase, the maximum charging voltage of a rechargeable battery is a first voltage. In the non pre-charge phase, the maximum charging voltage of the rechargeable battery is a second voltage. The first voltage is less than the second voltage.

That is to say, for the same voltage of the power supply, the maximum charging voltage of the rechargeable battery is small at the pre-charge phase, so that the voltage difference between the output voltage of the power supply and the charging voltage of the rechargeable battery is greater than the first difference threshold, the transfer switch is controlled by the controller to be connected to the protection circuit, and the first charging circuit is thus formed. At the same time, the controller communicates with a charge management chip, and the charging management chip controls the protection circuit to communicate with the charging control switch, so that the charging load is charged by the first charging circuit. In the non pre-charge phase, the maximum charging voltage of the rechargeable battery is large, so that the voltage difference between the output voltage of the power supply and the charging voltage of the rechargeable battery is less than the first difference threshold and greater than the second difference threshold, the transfer switch is controlled by the controller to be connected to the charging control switch. At the same time, the controller communicates with the charging management chip, and the charging management chip controls the charging control switch to be connected, so that the charging load is charged by the second charging circuit.

The structural schematic diagram of the charging circuit in the charging case is shown in FIG. 1. The first charging circuit and the second charging circuit that share a device are provided in the charging circuit. The impedance of the first charging circuit is greater than the impedance of the second charging circuit. The first charging circuit passes through a communication circuit, a protection circuit, and a charging control switch. The second charging circuit passes through the communication circuit and the charging control switch. The device shared by the first charging circuit and the second charging circuit is the charging control switch.

The process in which the controller in the charging circuit performs the step at 301 may include, for example when the wireless headset is placed in the charging case, charging the battery in the wireless headset by the first charging circuit in response to determining that the voltage difference between the output voltage of the power supply and the charging voltage of the battery in the wireless headset is greater than the first difference threshold. The second difference threshold is lower than the first difference threshold.

At 302, in response to detecting that a voltage difference between an output voltage of a power supply and a charging voltage of the wireless headset is greater than a second difference threshold, the transfer switch is controlled to be connected to the charging control switch, for switching to a second charging circuit and charging the wireless headset by the second charging circuit.

The first charging circuit includes a communication circuit, a protection circuit and a charging control switch. The charging control switch is connected with the protection circuit. The communication circuit includes a transfer switch. The transfer switch is connected to the power supply. The transfer switch is used to connect the power supply to the protection circuit or the charging control switch. Correspondingly, the process in which the controller in the charging circuit performs the step at 302 may include, for example, in response to determining that the voltage difference between the output voltage of the power supply and the charging voltage of the battery in the wireless headset is greater than the second difference threshold, controlling the transfer switch to be connected to the charging control switch, and charging the wireless headset by the second charging circuit, which passes through the communication circuit and the charging control switch.

When the voltage difference between the output voltage of the power supply and the charging voltage of the battery in the wireless headset is less than or equal to the first difference threshold, the first charging circuit and the second charging circuit are not used to charge the rechargeable battery.

The second difference threshold is much lower than the first difference threshold. Since the second difference threshold is much lower than the first difference threshold, the first difference threshold may be 0.2V, for example, and a difference between the second difference threshold and 0 is very small. By judging the difference, switching the transfer switch, connecting and disconnecting the protection circuit and the charging control switch, it may be achieved that, the battery in the wireless headset is charged by the first charging circuit or the second charging circuit.

The method for charging a wireless headset according to the embodiment of the disclosure, when the wireless headset is placed in the charging case, the first charging circuit in the charging circuit of the charging case is used to charge the wireless headset. The charging case is provided with a first charging circuit and a second charging circuit. The maximum charging voltage of the first charging circuit is lower than the maximum charging voltage of the second charging circuit. When the voltage difference between the output voltage of the power supply and the charging voltage of the battery in the wireless headset is greater than the second difference threshold, the second charging circuit is used to charge the battery in the wireless headset, so that the battery may be charged by two charging circuits, in which the second charging circuit has a larger maximum charging voltage and a smaller impedance than the first charging circuit, thus improving the charging efficiency.

According to a fifth aspect of embodiments of the disclosure, an electronic device is provided. The electronic device includes: a processor and a memory stored with instructions executable by the processor. When the instructions are executed by the processor, the processor is enabled to implement the above method for charging a wireless headset.

In order to implement the above embodiments, the disclosure also provides a non-transitory computer-readable storage medium having instructions stored. When the instructions are executed by a processor, the electronic device is enabled to implement the above method for charging a wireless headset.

In order to implement the above embodiments, the disclosure also provides a computer program product. When the computer program product is executed by a processor of the electronic device, the electronic device is enabled to implement the above method for charging a wireless headset.

Figure 4:
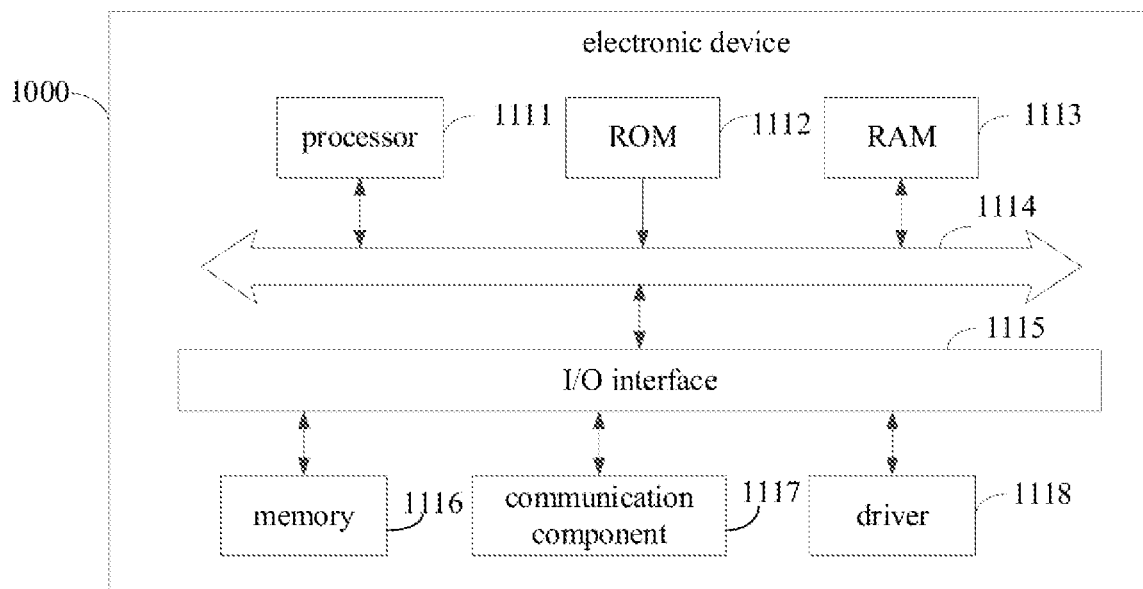
FIG. 4 is a structural block diagram of an electronic device according to an embodiment of the disclosure.

FIG. 4 is a structural block diagram of an electronic device according to an embodiment of the disclosure. The electronic device shown in FIG. 4 is only an example, and should not impose any limitation on the functions and scope of use of the embodiments of the disclosure.

As illustrated in FIG. 4, the electronic device 1000 may include a processor 1111 that may perform various appropriate actions and processes according to programs stored in a read only memory (ROM) 1112 or programs loaded from a memory 1116 into a random access memory (RAM) 1113. The RAM 1113 also stores various programs and data needed for the operations of the electronic device 1000. The ROM 1112, and RAM 1113 are connected to each other through a bus 1114. An input/output (I/O) interface 1115 is also connected to the bus 1114.

The following components are connected to the I/O interface 1115: the memory 1116 including a hard disk or the like; and a communication component 1117 including a network interface card such as a local area network (LAN) card, a modem, and the like. The communication component 1117 performs communication processing via a network such as the Internet. The driver 1118 is also connected to the I/O interface 1115 as needed.

In particular, according to an embodiment of the disclosure, the processes described above with reference to the flowchart may be implemented as a computer software program. For example, embodiments of the present disclosure include computer programs carried on a computer-readable medium, the computer programs including program codes for executing the method shown in the flowchart. In such embodiment, the computer programs may be downloaded and installed from the network through the communication component 1117. When the computer programs are executed by the processor 1111, the above described functions defined in the method of the disclosure are performed.

In an embodiment, there is also provided a storage medium including instructions, such as a memory including instructions, which may be executed by the processor 1111 of the electronic device 1000, to complete the above described method. Alternatively, the storage medium may be a non transitory computer-readable storage medium, for example, the non-transitory computer-readable storage medium may be a ROM, a random access memory (RAM), a CD-ROM, a magnetic tape, a floppy disk, an optical data storage device, and the like.

In the disclosure, the computer-readable storage medium may be any tangible medium containing or storing programs that may be used by or in combination with an instruction execution system, apparatus, or device. In the disclosure, the computer-readable signal medium may include a data signal propagated in a baseband or as part of a carrier wave, in which the computer-readable program codes are carried. This propagated data signal may take many forms, including but not limited to electromagnetic signals, optical signals, or any suitable combination of the above. The computer-readable signal medium may also be any computer-readable medium other than a computer-readable storage medium that may transmit, propagate, or transmit programs for use by or in combination with an instruction execution system, apparatus, or device. The program codes contained on the computer-readable medium may be transmitted by any suitable medium, including but not limited to: wireless, electric wires, optical cables, RF, etc., or any suitable combination of the above.

Other embodiments of the disclosure may be easily envisaged for those skilled in the art after considering the specification and practicing the invention disclosed herein. The invention is intended to cover any variation, use or adaptive change of the disclosure, which follows the general principles of the disclosure and includes common knowledge or conventional technical means in the art not disclosed in the disclosure. The description and the embodiments are only considered as exemplary, and the true scope and spirit of the disclosure are indicated by the following claims.

It should be understood that the disclosure is not limited to the precise structure already described above and shown in the drawings, and various modifications and changes may be made without departing from the scope of the specification. The scope of the disclosure is limited only by the appended claims.

What is claimed is:

1. A charging circuit, comprising:
   a protection circuit and a charging control switch connected in series; and
   a transfer switch, configured to switch to a first charging circuit by connecting to the protection circuit and configured to switch to a second charging circuit by connecting to the charging control switch, wherein a maximum charging voltage of the first charging circuit is lower than a maximum charging voltage of the second charging circuit.

2. The charging circuit of claim 1, further comprising: a controller, configured to control the transfer switch to be connected to the protection circuit so as to switch to the first charging circuit, or configured to control the transfer switch to be connected to the charging control switch so as to switch to the second charging circuit.

3. The charging circuit of claim 2, wherein the transfer switch is configured to:
   in response to determining that a voltage difference between an output voltage of a power supply and a charging voltage of a charging load is greater than a first difference threshold, switch to the first charging circuit; and
   in response to determining that the voltage difference between the output voltage of the power supply and the charging voltage of the charging load is greater than a second difference threshold, switch to the second charging circuit;
   wherein the second difference threshold is lower than the first difference threshold.

4. The charging circuit of claim 3, wherein the charging load comprises a wireless headset.

5. The charging circuit of claim 1, wherein the transfer switch comprises a single-pole double-throw switch.

6. The charging circuit of claim 1, wherein the transfer switch comprises two single-pole single-throw switches.

7. The charging circuit of claim 1, wherein the protection circuit comprises a first metal oxide semiconductor (MOS) switch circuit and a second MOS switch circuit, and a D pole of the first MOS switch circuit is connected to a D pole of the second MOS switch circuit.

8. The charging circuit of claim 1, wherein the charging control switch comprises a third metal oxide semiconductor (MOS) switch circuit, and an impedance of the protection circuit is greater than an impedance of the charging control switch.

9. A charging case, comprising:
   a charging interface, configured to connect the charging case to a power supply;
   a charging base, configured to place a wireless headset; and
   a charging circuit, comprising a protection circuit and a charging control switch connected in series, and a transfer switch;
   wherein the transfer switch is configured to switch to a first charging circuit by connecting to the protection circuit and configured to switch to a second charging circuit by connecting to the charging control switch;
   wherein a maximum charging voltage of the first charging circuit is lower than a maximum charging voltage of the second charging circuit.

10. The charging case of claim 9, wherein the charging circuit further comprises:
    a controller, configured to control the transfer switch to be connected to the protection circuit so as to switch to the first charging circuit, or configured to control the transfer switch to be connected to the charging control switch so as to switch to the second charging circuit.

11. The charging case of claim 10, wherein the transfer switch is configured to:
    in response to determining that a voltage difference between an output voltage of the power supply and a charging voltage of the wireless headset is greater than a first difference threshold, switch to the first charging circuit; and
    in response to determining that a voltage difference between the output voltage of the power supply and the charging voltage of the wireless headset is greater than a second difference threshold, switch to the second charging circuit;
    wherein the second difference threshold is lower than the first difference threshold.

12. The charging case of claim 9, wherein the transfer switch comprises a single-pole double-throw switch.

13. The charging case of claim 9, wherein the transfer switch comprises two single-pole single-throw switches.

14. The charging case of claim 9, wherein the protection circuit comprises a first metal oxide semiconductor (MOS) switch circuit and a second MOS switch circuit, and a D pole of the first MOS switch circuit is connected to a D pole of the second MOS switch circuit.

15. The charging case of claim 9, wherein the charging control switch comprises a third metal oxide semiconductor (MOS) switch circuit, and an impedance of the protection circuit is greater than an impedance of the charging control switch.

16. A method for charging a wireless headset with a charging case, comprising:
    in response to determining that the wireless headset is placed in the charging case, switching to a first charging circuit by controlling a transfer switch to be connected to a protection circuit, and charging the wireless headset by the first charging circuit, wherein the charging case comprises the protection circuit and a charging control switch connected in series, and the transfer switch; and
    in response to detecting that a voltage difference between an output voltage of a power supply and a charging voltage of the wireless headset is greater than a second difference threshold, switching to a second charging circuit by controlling the transfer switch to be connected to the charging control switch, and charging the wireless headset by the second charging circuit;
    wherein a maximum charging voltage of the first charging circuit is lower than a maximum charging voltage of the second charging circuit.

17. The method of claim 16, further comprising:
    in response to detecting a voltage difference between the output voltage of the power supply and the charging voltage of the wireless headset is greater than a first difference threshold, charging the battery in the wireless headset by the first charging circuit;

wherein the second difference threshold is lower than the first difference threshold.

18. The method of claim 16, wherein the protection circuit comprises a first metal oxide semiconductor (MOS) switch circuit and a second MOS switch circuit, and a D pole of the first MOS switch circuit is connected to a D pole of the second MOS switch circuit.

19. The method of claim 16, wherein the charging control switch comprises a third metal oxide semiconductor (MOS) switch circuit, and an impedance of the protection circuit is greater than an impedance of the charging control switch.

20. The method of claim 16, wherein the transfer switch comprises a single-pole double-throw switch.

* * * * *